(12) United States Patent
Kagawa et al.

(10) Patent No.: US 6,369,995 B1
(45) Date of Patent: Apr. 9, 2002

(54) PROTECTION RELAY DEVICE FOR DISTRIBUTION EQUIPMENT

(75) Inventors: Kazuhiko Kagawa; Eiji Moritoh, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/474,097

(22) Filed: Dec. 29, 1999

(30) Foreign Application Priority Data

Jan. 8, 1999 (JP) .......................................... 11-003290

(51) Int. Cl.[7] ................................................ H02H 3/00
(52) U.S. Cl. .............................. 361/62; 361/64; 361/66
(58) Field of Search ............................ 361/62–75, 111, 361/115, 80, 81; 307/85–86, 38, 42

(56) References Cited

U.S. PATENT DOCUMENTS 5,341,268 A * 8/1994 Ishiguro et al. ................ 361/65
5,574,611 A * 11/1996 Nishijima et al. ............. 361/64
6,008,971 A * 12/1999 Duba et al. .................... 361/64
6,160,690 A * 12/2000 Matsumoto et al. ........... 361/64

FOREIGN PATENT DOCUMENTS

JP          7322470          12/1995

* cited by examiner

Primary Examiner—Stephen W. Jackson
(74) Attorney, Agent, or Firm—Leydig, Voit, & Mayer, Ltd.

(57) ABSTRACT

A protection relay device for distribution equipment is provided with breakers respectively disposed at branches of a distribution system having the branches in a hierarchical structure, relays respectively disposed at the branches and detecting a short-circuit failure in a lower-rank section and outputting a detection signal, and a central control device receiving the detection signals output by the relays, determining a short-circuit failure section where a short-circuit failure has occurred from the detection signal received, and operating the relay of the branch corresponding to the short-circuit failure section to open the breaker corresponding to the relay.

5 Claims, 4 Drawing Sheets

FIG. 3A  OUTPUT SIGNAL OF HIGHER-RANK RELAY 5A

FIG. 3B  OUTPUT SIGNAL OF MIDDLE-RANK RELAY 5B

FIG. 3C  OUTPUT SIGNAL OF LOWER-RANK RELAY 5D 1 msec OR LESS 1 msec OR LESS

PROTECTION RELAY DEVICE FOR DISTRIBUTION EQUIPMENT

BACKGROUND OF THE INVENTION

The present invention relates to a protection relay device for the distribution equipment of a distribution system having a hierarchy of branches.

FIG. 5 is a diagram showing the system structure of the conventional distribution system described in the Institute of Electric Engineers of Japan, Technical Study Report, No. 469, p 28, which uses a timing different protection relay device and has a hierarchy of branches coupled to a power source. This distribution system includes branches 8 to 10 of the hierarchy structure coupled to a power source 1, a current transformer 4A for detecting total current flowing through the higher-rank branch 8, and a relay 3A which determines whether or not a short-circuit failure has occurred in a path from the higher-rank branch 8 to the downstream thereof on the basis or current value detected by the current transformer 4A and operates a breaker 2A for cutting off the current flowing through the higher-rank branch 8 at the time where it is determined that the short-circuit failure has occurred in the path.

This distribution system further includes a current transformer 4B for detecting total current flowing through the middle-rank branch 9, and a relay 3B which determines whether or not a short-circuit failure has occurred in a path from the middle-rank branch 9 downstream thereof on the basis of the current value detected by the current transformer 4B and operates a breaker 2B for cutting off the current flowing through the middle-rank branch 9 at the time where it is determined that the short-circuit failure has occurred in the path. Further, this distribution system includes a current transformer 4D for detecting total current flowing through the lower-rank branch 10, and a relay 3D which determines whether or not a short-circuit failure has occurred in a path from the lower-rank branch 10 or downstream-thereof on the basis of the current value detected by the current transformer 4D and operates a breaker 2D for cutting off the current flowing through the lower-rank branch 10 at the time where it is determined that the short-circuit failure has occurred in the path.

This distribution system further includes a current transformer 4E for detecting total current flowing through a lower-rank branch end 11, and a relay 3E which determines whether or not a short-circuit failure has occurred at the lower-rank branch end 11 on the basis of the current value detected by the current transformer 4E and operates a breaker 2E for cutting off the current flowing through the lower-rank branch end 11 at the time where it is determined that the short-circuit failure has occurred in the lower-rank branch end.

This distribution system further includes a current transformer 4C for detecting current flowing through the predetermined position of a system branched from the higher-rank branch 8, and a relay 3C which determines whether or not a short-circuit failure has occurred in a path from the predetermined position or downstream thereof on the basis of the current value detected by the current transformer 4C and operates a breaker 2C for cutting off the current flowing through the predetermined position at the time where it is determined that the short-circuit failure has occurred in the path. Further, this distribution system includes a current transformer 4F for detecting current flowing through another predetermined position downstream of the predetermined position, and a relay 3F which determines whether or not a short-circuit failure has occurred in a path from the another predetermined position or downstream thereof on the basis of the current value detected by the current transformer 4F and operates a breaker 2F for cutting off the current flowing through the another predetermined position at the time where it is determined that the short-circuit failure has occurred in the path.

According to the distribution system thus arranged, the relays 3A to 3F are arranged to have different time periods for starting the operations after the occurrence of the short-circuit failure in accordance with the corresponding ranks of the system branches 8 to 10 thereby to discriminate the section where the short-circuit failure occurred, respectively.

For example, the operation time period required for operating (current cut-off operating) the corresponding one of the breakers 2A to 2F after the detection of the same current is set to be longest in the relay 3A which is closest to the power source 1 and shortest in the relays 3D, 3E and 3F which are disposed at the lower-rank end.

Thus, when the short-circuit failure occurs, the breaker at the higher-rank side among the breakers closest to the section where the short-circuit failure has occurred operates at first thereby to cut off the current supplied from the power source 1. For example, when the short-circuit failure occurs at the lower-rank branch 10 of the relay 3D, although each of the relays 3A, 3B and 3D detects the excessive current, the relay 3D having the shortest operation time operates the breaker 2D to cut off the current at the earliest time point as compared with other relays.

Further, when the short-circuit failure occurs at the higher-rank branch 8 between the relay 3A and the relay 3B, the relay 3A detects the excessive current and operates the breaker 2A to cut off the current upon the lapse of the set operation time period.

In the aforesaid conventional protection relay device for distribution equipment, when a short-circuit failure occurs at the higher-rank branch 8 nearest to the power source 1, a large excessive current is generated and such phenomena as a voltage drop, an instantaneous power failure or the like influences a wide area of the lower-rank system. However, since the operation time period of the relay 3A is set to be longest, the time period required for the breaker 2A to operate after the occurrence of the short-circuit failure is long.

As a consequence, there arises a problem that the short-circuit failure continues for a long time and so the distribution equipment may be broken and the operation of the devices connected to the distribution equipment may be stopped.

Further, in the case where the number of the branches of the system increases, there arises a problem that, since the operation of the breakers of the higher-rank is further delayed, it is required to adjust the operation time periods of all the relays again.

As a technique relating to the aforesaid protection relay device for a distribution equipment, the Unexamined Japanese Patent Application Publication No. Hei. 7-322470 discloses "Protection Relay Central Management Device" wherein a central control device is coupled to a plurality of protection relays through a transmission path and the central control device collectively manages the operation states of the plurality of the protection relays. Further, as another technique relating to the aforesaid protection relay device for a distribution equipment, the Unexamined Japanese Patent Application Publication No. Sho. 58-119725 discloses "Protection Relay System for Non-Utility Transformation Equipment" wherein a protection relay is disposed at a portion within premises, terminal devices are provided at various portions of the premises, the terminal devices send current and voltage information and breaker information to the protection relay, and the protection relay collectively performs the calculation for protecting the respective equipment within the premises to determine the breaker associated with the failure and to trip the breaker directly or through the terminal device.

SUMMARY OF THE INVENTION

The present invention has been made in view of the aforesaid conventional circumstances and an object of the invention is to provide a protection relay device for the distribution equipment which can determine a short-circuit failure section without differentiating the operation time periods among relays and remove the cause of the short-circuit failure quickly.

An object of the invention is to provide a protection relay device for the distribution equipment which can remove the cause of the short-circuit failure quickly without causing the delay of the detection of a short-circuit failure due to the transmission procedure of a transmission line.

An object of the invention is to provide a protection relay device for the distribution equipment which can remove the cause of the short-circuit failure quickly.

The protection relay device for the distribution equipment according to the invention is comprises:

breakers respectively disposed at branches of a distribution system having the branches of a hierarchy structure;

a plurality of relays respectively disposed at the branches, each of the plurality of relays detecting a short-circuit failure occurred at a lower-rank section thereof and outputting a detection signal; and a central control device which receives the detection signals outputted from the plurality of relays, determines a short-circuit failure section where a short-circuit failure occurs on a basis of the detection signal thus received, and renders one of the plurality of relays of the branch corresponding to the short-circuit failure section thus determined to operate one of the breakers corresponding to the one of the plurality of relays.

A protection relay device for the distribution equipment according to the invention has the plurality of relays coupled to the central control device through a transmission path.

A protection relay device for the distribution equipment according to the invention has, in the central control device, a selection means for selecting the relay of the branch located at a lowest rank among the relays which outputted the detection signals received by the central control device as the relay of the branch located at a just higher rank of the short-circuit failure section, and a means for rendering the relay selected by the selection means to operate the breaker of the branch located at a just higher rank of the short-circuit failure section.

The protection relay device for the distribution equipment according to the invention a part or entirety of a transmission path shared by the plurality of relays, and the plurality of relays are arranged to have different sending start timings for starting sending of the detection signal that the sending start timings differ by 1 msec or less at every rank of the corresponding branch.

The protection relay device for the distribution equipment according to the invention has some or all of the breakers an interruption time of 20 msec or less.

BRIEF DESCRIPTION OF THE DRAWINGS

FIGS. 3A to 3C are timing chart showing the operation of relays.

DETAILED DESCRIPTION OF THE PREFERRED EMBODIMENTS

Embodiments of the present invention will be described with reference to the accompanying drawings.

First Embodiment

Figure 1:
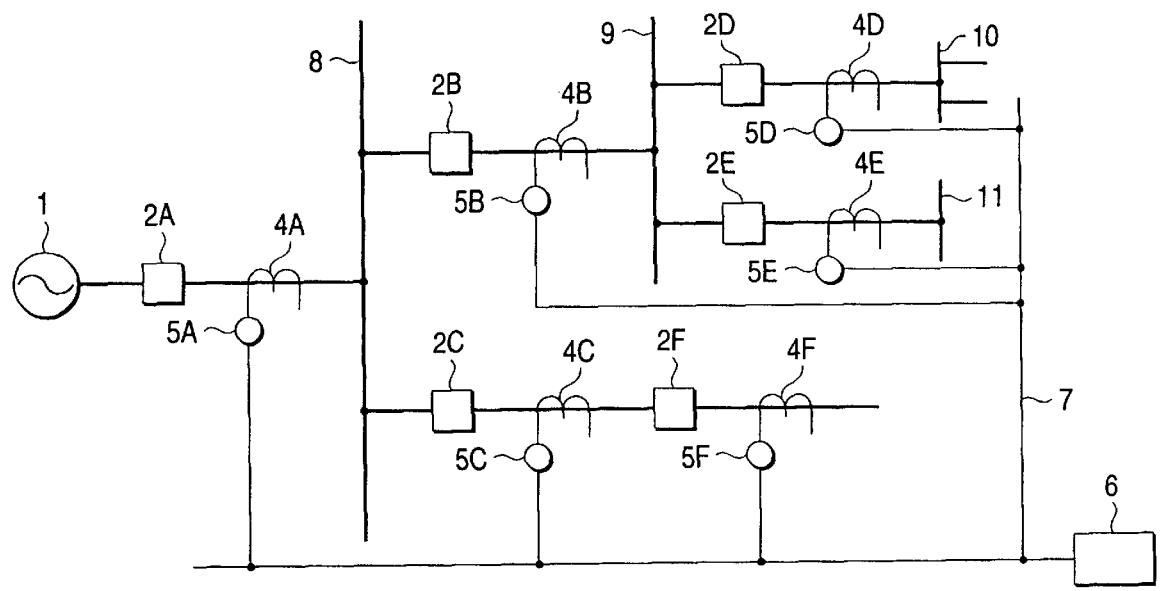
FIG. 1 is a diagram showing the system configuration of the protection relay device for the distribution equipment according to an embodiment of the present invention.

FIG. 1 is a diagram showing the system configuration of the protection relay device for the distribution equipment according to the first embodiment of the present invention. In the protection relay device for the distribution equipment, this distribution system includes branches 8 to 10 of a hierarchy structure coupled to a power source 1, a current transformer 4A for detecting total current flowing through the higher-rank branch 8, and a relay 5A which determines whether or not a short-circuit failure has occurred in a path from the higher-rank branch 8 to the downstream thereof on the basis of the current value detected by the current transformer 4A, and at the time where it is determined that the short-circuit failure has occurred in the path, transmits a detection signal of the short-circuit failure to a central control device 6 through a transmission path 7 and operates a breaker 2A for cutting off the current flowing through the higher-rank branch 8 when receiving an instruction signal from the central control device 6 through the transmission path 7.

This distribution system further includes a current transformer 4B for detecting total current flowing through the middle-rank branch 9, and a relay 5B which determines whether or not a short-circuit failure has occurred in a path from the middle-rank branch 9 to the downstream thereof on the basis of the current value detected by the current transformer 4B, and at the time where it is determined that the short-circuit failure has occurred in the path, transmits a detection signal of the short-circuit failure to the central control device 6 through the transmission path 7 and operates a breaker 2B for cutting off the current flowing through the middle-rank branch 9 when receiving an instruction signal from the central control device 6 through the transmission path 7. Further, this distribution system includes a current transformer 4D for detecting total current flowing through the lower-rank branch 10, and a relay 5D which determines whether or not a short-circuit failure has occurred in a path from the lower-rank branch 10 to the downstream thereof on the basis of the current value detected by the current transformer 4D, and at the time where it is determined that the short-circuit failure has occurred in the path, transmits a detection signal of the short-circuit failure to the central control device 6 through the transmission path 7 and operates a breaker 2D for cutting off the current flowing through the lower-rank branch 10 when receiving an instruction signal from the central control device 6 through the transmission path 7.

This distribution system further includes a current transformer 4E for detecting total current flowing through a lower-rank branch end 11, and a relay 5E which determines whether or not a short-circuit failure has occurred at the lower-rank branch end 11 on the basis of the current value detected by the current transformer 4E, and at the time where it is determined that the short-circuit failure has occurred at the lower-rank branch end, transmits a detection signal of the short-circuit failure to a central control device 6 through a transmission path 7 and operates a breaker 2E for cutting off the current flowing through the lower-rank branch end 11 when receiving an instruction signal from the central control device 6 through the transmission path 7.

This distribution system further includes a current transformer 4C for detecting current flowing through the predetermined position of a system branched from the higher-rank branch 8, and a relay 5C which determines whether or not a short-circuit failure has occurred in a path from the predetermined position to the downstream thereof on the basis of the current value detected by the current transformer 4C, and at the time where it is determined that the short-circuit failure has occurred in the path, transmits a detection signal of the short-circuit failure to the central control device 6 through the transmission path 7 and operates a breaker 2C for cutting off the current flowing through the predetermined position when receiving an instruction signal from the central control device 6 through the transmission path 7. Further, this distribution system includes a current transformer 4F for detecting current flowing through another predetermined position downstream of the predetermined position, and a relay 5F which determines whether or not a short-circuit failure has occurred in a path from the another predetermined position to the downstream thereof on the basis of the current value detected by the current transformer 4F, and at the time where it is determined that the short-circuit failure has occurred in the path, transmits a detection signal of the short-circuit failure to the central control device 6 through the transmission path 7 and operates a breaker 2F for cutting off the current flowing through the another predetermined position when receiving an instruction signal from the central control device 6 through the transmission path 7.

Figure 2:
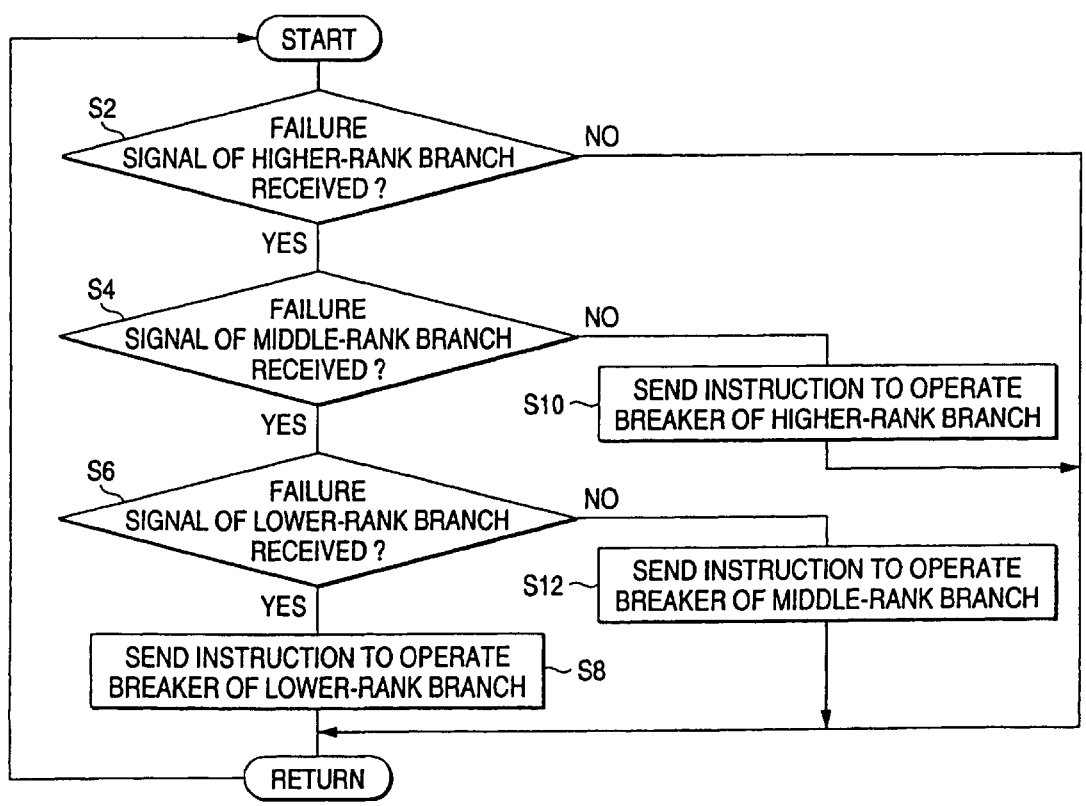
FIG. 2 is a flow chart showing the operation of a central control device.

The operation of the above-described protection relay device for the distribution equipment according to the embodiment will be explained with reference to the flow chart shown in FIG. 2 representing the operation of the central control device 6.

The central control device 6 checks whether or not the detection signal of the short-circuit failure is received from the relay 5A of the higher-rank branch through the transmission path 7 (S2), and if it is determined that the detection signal is not received, it is determined that the short-circuit failure has not occurred and the process returns to the start point.

If the central control device 6 receives the detection signal of the short-circuit failure from the relay 5A of the higher-rank branch (S2), the central control device checks whether or not the detection signal of the short-circuit failure is received from the relay 5B or the relay 5C of the middle-rank branch (S4). If it is determined that the detection signal is not received, it is determined that the short-circuit failure has occurred at the higher-rank branch and the central control device sends an instruction signal for operating the breaker 2A of the higher-rank branch to the relay 5A of the higher-rank branch through the transmission path 7 (S10). The relay 5A receives the instruction signal and operates the breaker 2A to cut off the current supplied from the power source 1, and then the process returns to the start point.

If the central control device 6 receives the detection signal of the short-circuit failure from the relay 5B or the relay 5C of the middle-rank branch (S4), the central control device checks whether or not the detection signal of the short-circuit failure is received from the relay 5D, the relay 5E or the relay 5F of the lower-rank branch (S6). If it is determined that the detection signal is not received, it is determined that the short-circuit failure has occurred at the middle-rank branch and the central control device sends an instruction signal for operating the breaker 2B or the breaker 2C of the middle-rank branch through the transmission path 7 to the relay 5B or the relay 5C of the middle-rank branch from which the instruction signal is received (S12). The relay 5B or the relay 5C receives the instruction signal and operates the breaker 2B or the breaker 2C to cut off the current supplied from the power source 1, and then the process returns to the start point.

If the central control device 6 receives the detection signal of the short-circuit failure from the relay 5D, the relay 5E or the relay 5F of the lower-rank branch (S6), the central control device determines that the short-circuit failure has occurred at the lower-rank branch and the central control device sends an instruction signal for operating the breaker 2D, the breaker 2E or the breaker 2F of the lower-rank branch through the transmission path 7 to the relay 5D, the relay 5E or the relay 5F of the lower-rank-branch from which the instruction signal is received (S8). The relay 5D, the relay 5E or the relay 5F receives the instruction signal and operates the breaker 2D, the breaker 2E or the breaker 2F to cut off the current supplied from the power source 1, and then the process returns to the start point.

That is, for example, when the short-circuit failure occurs at the lower-rank branch 10 of the relay 5D, each of the relays 5A, 5B and 5D detects the excessive current and sends the detection signal of the short-circuit failure to the central control device 6 through the transmission path 7. The central control device 6 receives the detection signal of the short-circuit failure from each of the relay 5A of the higher-rank branch, the relay 5B of the middle-rank branch and the relay 5D of the lower-rank branch, so that the central control device determines that the short-circuit failure has occurred at the lower-rank branch 10 of the lowest rank and sends an instruction signal for operating the breaker 2D of the lower-rank branch 10 through the transmission path 7 to the relay 5D. Thus, the relay 5D receives the instruction signal and operates the breaker 2D to cut off the current supplied from the power source 1.

When the short-circuit failure occurs at the higher-rank branch 8 between the relay 5A and the relay 5B, the relay 5A detects the excessive current and sends the detection signal of the short-circuit failure to the central control device 6 through the transmission path 7. The central control device 6 receives the detection signal of the short-circuit failure from the relay 5A of the higher-rank branch 8 but does not receive the detection signal of the short-circuit failure from the relay 5B of the middle-rank branch 9, so that the central control device determines that the short-circuit failure has occurred at the higher-rank branch 8 and sends an instruction signal for operating the breaker 2A of the higher-rank branch 8 through the transmission path 7 to the relay 5A. Thus, the relay 5A receives the instruction signal and operates the breaker 2A to cut off the current supplied from the power source 1.

Accordingly, in the case where the short-circuit failure occurs at any of the sections, the central control device 6 can operate the breaker corresponding to the section where the short-circuit failure has occurred and cut off the current.

Further, the embodiment can easily cope with the case where the number of the hierarchy of the branches increases by adding one or more determination steps to the flow chart shown in FIG. 2.

A part or entirety of the transmission path 7 is shared by the plurality of the relays 5A to 5F like the bus system. The relays 5A to 5F are arranged to have different starting times for sending the detection signal of the short-circuit failure so the start times differ by 1 msec or less at every rank of the corresponding branch as shown in the timing chart of FIGS. 3A to 3C.

For example, when the short-circuit failure occurs at the lower-rank branch 10 of the relay 5D, each of the relays 5A, 5B and 5D detects the excessive current and sends the detection signal of the short-circuit failure to the central control device 6 through the transmission path 7. In this case, as shown in the timing chart of FIGS. 3A to 3C, the relays 5A, 5B and 5D send the detection signals in the order of the relays 5A, 5B and 5D in accordance with the sending start timings thereof. Thus, the delayed operation and erroneous operation of the breakers due to the duplication of the detection signals on the transmission path 7 can be prevented easily without duplexing the detection signals nor using an access control means or the like.

Since the difference among the sending start timings of the relays 5A, 5B and 5D is set to be 1 msec or less at every relay, the transmission path can be formed by a high-versatility coaxial cable with the transmission speed of about 10 Mbps or the like without influencing on the time period required for operating the breaker after the occurrence of the short-circuit failure.

Second Embodiment

Figure 4:
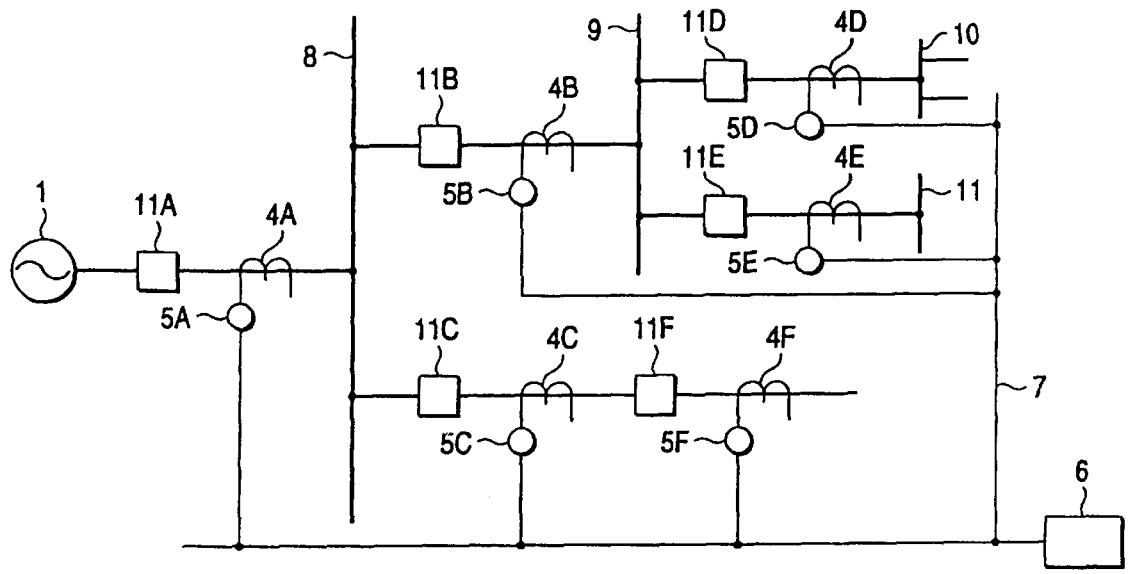
FIG. 4 is a diagram showing the system configuration of the protection relay device for the distribution equipment according to another embodiment of the present invention.
Figure 5:
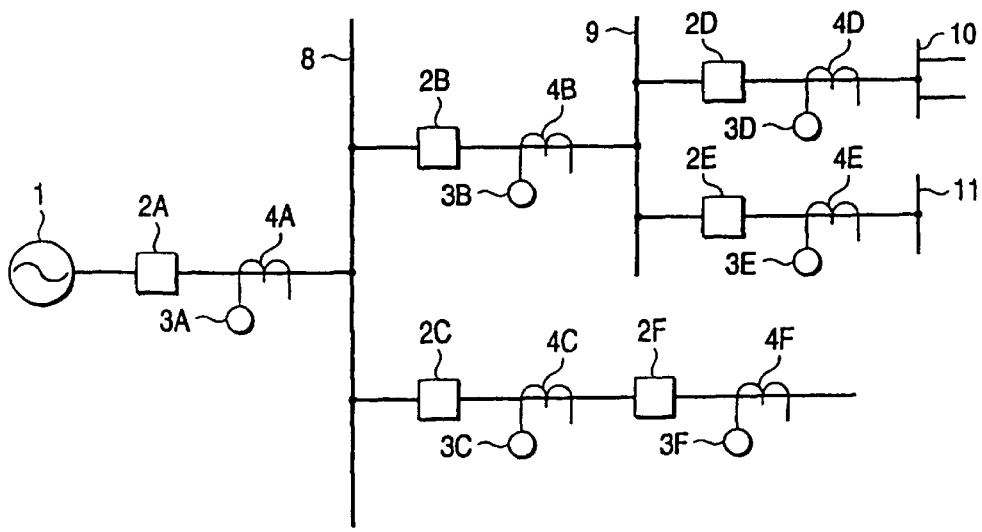
FIG. 5 is a diagram showing an example of the system configuration of the conventional distribution system.

FIG. 4 is a diagram showing the system configuration of the protection relay device for the distribution equipment according to the second embodiment of the present invention. In the protection relay device for the distribution equipment of this embodiment, the breakers 2A to 2F shown in FIG. 1 are replaced by breakers 11A to 11F, respectively. A part or all of the breakers 11A to 11F is a high-speed breaker(s) having an interruption time of 20 msec or less which is a time period required for extinguishing an arc and cutting off the current after receiving an operation instruction.

For example, a mechanical type high-speed breaker utilizing electromagnetic repulsive force at the switching mechanism thereof is high in a response speed and can cut off the current with the interruption time of 1 cycle of commercial AC power frequency, that is, 20 msec or less. Other configuration and operation of this embodiment are same as those of the protection relay device for the distribution equipment according to the first embodiment, and so the explanation thereof is omitted.

According to such a protection relay device for the distribution equipment, the time period required for cutting off the current after the occurrence of the short-circuit failure can be shortened.

As described above, in a protection relay device for distribution equipment according to the invention, the breakers are respectively disposed at the branches of the distribution system having the branches of the hierarchy structure, and the plurality of relays respectively disposed at the branches, wherein each of the plurality of relays detects a short-circuit failure occurred at a lower-rank section thereof and outputting the detection signal. The central control device receives the detection signals outputted from the plurality of relays, determines a short-circuit failure section where a short-circuit failure occurs on a basis of the detection signal thus received, and renders one of the plurality of relays of the branch corresponding to the short-circuit failure section thus determined to operate one of the breakers corresponding to the one of the plurality of relays. According to such a configuration, a short-circuit failure section can be determined without differentiating the operation time periods among relays and the cause of the short-circuit failure can be removed quickly.

In a protection relay device for the distribution equipment according to the invention, since the plurality of relays are coupled to the central control device through a transmission path, a short-circuit failure section can be determined without differentiating the operation time periods among relays and the cause of the short-circuit failure can be removed quickly.

In a protection relay device for the distribution equipment according to the invention, the selection means of the central control device selects the relay of the branch located at the lowest rank among the relays which outputted the detection signals received by the central control device as the relay of the branch located at a just higher rank of the short-circuit failure section, and the operation means of the central control device renders the relay selected by the selection means to operate the breaker of the branch located at a just higher rank of the short-circuit failure section. According to such a configuration, a short-circuit failure section can be determined without differentiating the operation time periods among relays and the cause of the short-circuit failure can be removed quickly.

In a protection relay device for the distribution equipment according to the invention, a part or entirety of the transmission path is shared by the plurality of relays, and the plurality of relays are arranged to have different start times for sending the detection signal so that the start differ by 1 msec or less at every rank of the corresponding branch. According to such a configuration, the cause of the short-circuit failure can be removed quickly without causing the delay of the detection of a short-circuit failure due to the transmission procedure of a transmission line.

In a protection relay device for the distribution equipment according to the invention, since a part or all of the breakers have an interruption time of 20 msec or less, the cause of the short-circuit failure can be removed quickly.

What is claimed is:

1. A protection relay device for distribution equipment for a power distribution system including branches arranged in a hierarchy of successively higher-rank and lower-rank branches, the distribution system including at least a higher-rank branch, a middle-rank branch, and a lower-rank branch, the protection relay device comprising:

a plurality of breakers, at least one breaker being disposed within each branch of the distribution system for connecting and disconnecting the respective branch;

a plurality of relays, one relay being associated with each of said breakers for detecting a short-circuit failure occurring in the branch including the associated breaker, and, in response to detecting a short-circuit failure, outputting a detection signal; and a central control device receiving the detection signals output by said plurality of relays, identifying a branch in which a short-circuit failure has occurred based on received detection signals, and causing a relay of one of the branches to open the associated breaker to remove the short-circuit failure, wherein said central control device includes:

selection means for identifying, from the detection signals received, the branch of a lowest rank of the branches having relays to other parts which do not output detection signals, and for selecting the relay of the branch of next higher rank above the branch of lowest rank identified, and means for actuating the relay selected by said selection means to open the associated breaker.

2. A protection relay device for distribution equipment for a power distribution system including branches arranged in a hierarchy of successively higher-rank and lower-rank branches, the distribution system including at least a higher-rank branch, a middle-rank branch, and a lower-rank branch, the protection relay device comprising:

a plurality of breakers, at least one breaker being disposed within each branch of the distribution system for connecting and disconnecting the respective branch;

a plurality of relays one relay being associated with each of said breakers for detecting a short-circuit failure occurring in the branch including the associated breaker, and, in response to detecting a short-circuit failure, outputting a detection signal;

a central control device receiving the detection signals output by said plurality of relays, identifying a branch in which a short-circuit failure has occurred based on received detection signals, and causing a relay of one of the branches to open the associated breaker to remove the short-circuit failure; and a transmission path coupling said plurality of relays to said central control device, wherein at least a part of said transmission path is shared by more than one of said relays, and said relays have different start times for sending of detection signal to said central control device and the start times of the detection signals for the branches of respective ranks differ by no more than 1 msec between successive ranks of branches.

3. The protection relay device for distribution equipment according to claim 1, wherein at least some of said plurality of breakers open in no more than 20 msec.

4. The protection relay device for distribution equipment according to claim 2, wherein at least some of said plurality of breakers open in no more than 20 msec.

5. The protection relay device for distribution equipment according to claim 2, wherein the start times for sending of the detection signals by said relays is arranged in accordance with the rank of the branches including the respective relays, said relays of higher rank branches sending detection signals before said relays of lower rank branches.

* * * * *